United States Patent
Bergeron

[11] 3,825,023
[45] July 23, 1974

[54] TRAILER AWNING STRAP

[76] Inventor: Joseph S. Bergeron, 28 Morris St., West Warwick, R.I. 02893

[22] Filed: May 30, 1972

[21] Appl. No.: 257,552

[52] U.S. Cl. ............................................ 135/5 AT
[51] Int. Cl. ............................................. E04f 10/00
[58] Field of Search ............ 135/5 A, 5 AT; 160/22, 160/45, 46, 47, 67

[56] References Cited
UNITED STATES PATENTS

| 25,723 | 10/1859 | Chase | 160/22 |
|---|---|---|---|
| 758,016 | 4/1904 | Mudd | 160/22 |
| 1,833,688 | 11/1931 | Nelson et al. | 160/22 |
| 2,568,048 | 8/1951 | Arnold | 135/5 AT |

*Primary Examiner*—Peter M. Caun
*Attorney, Agent, or Firm*—Barlow & Barlow

[57] ABSTRACT

A rolled trailer awning retaining device having a C-shaped aluminum strap which is substantially rigid. At the top end of the strap the metal has been looped back upon itself to form an integral hinge pin bore which mates with the cutaway section of an aluminum hinge plate which has a pair of spaced apart aligned hinge pin bores that align with the hinge pin bore of the C-shaped strap. A brass pin is inserted through the aligned bores to secure the members together in pivotal relationship. Adjacent the hinge pin bore on the C-shaped strap is a substantially flat portion. Between this flat surface portion and the lower tip of the strap the strap member is substantially circular in cross section with the area encompassed by this portion receiving the rolled awning which rests thereon. The tip of the strap has a curved surface which has been formed by folding the metal back upon itself.

8 Claims, 4 Drawing Figures

PATENTED JUL 23 1974

3,825,023

TRAILER AWNING STRAP

BACKGROUND OF THE INVENTION

Applicant's invention relates to trailer awning retaining devices for retaining the awning of a mobile house trailer in a compact rolled up condition during over the highway movement of the trailer. In the past these rolled awning retaining devices were generally in the form of a leather or fabric strap which was looped beneath the awning rail and then around the rolled trailer awning with some type of buckle structure for tightening it down. These types of devices have been far from satisfactory since the buckle devices tend to corrode and jam, thus making them inoperable. Also on these types of devices the weight of the awning is continuously trying to loosen the strap and upon occasion this has happened causing much distress to the owner of the trailer. Additionally due to the heavy weight of canvas, the awnings place quite a strain on the strength of the straps and since the straps are normally exposed to all types of weather, their strength is quickly reduced after a short period of time. Also threading the strap through the buckle and securing the straps proves quite cumbersome especially while attempting to support the weight of the canvas in its rolled position. This puts quite a strain on elderly persons who are attempting to roll and secure their own awnings.

SUMMARY OF THE INVENTION

Applicant's novel rolled awning retaining device is quickly and easily installed on the side of a trailer. It can be utilized with awnings having all types of awning rail members. Its initial cost is relatively inexpensive and the life of the trailer awning strap is infinite and there is no problem with corrosion of its hinging structure. In operation the awning is rolled into a coil just beneath the C-shaped strap members. These straps are then lifted outwardly and upwardly as they pivot around their hinge connection. The portion of the strap adjacent the hinge area is substantially flat which allows the strap to be pivoted upwardly through an angle of approximately 90° without the top portion of the strap binding into the outer surface of the wall of the trailer. At this point the rolled awning is wound a slight bit more and at the same time pushed upwardly into the space formerly enclosed by the C-shaped strap. The strap is then allowed to pivot downwardly and inwardly either with help or due to the gravitational weight of the strap member itself. As it swings into position it forms a closed loop around the rolled awning with the tip of the strap exerting a constant force against the side of the trailer. Since the tip of the strap is slightly curved upwardly, the rolled awning as it settles downwardly seats in a cradle position and the weight of the awning also acts to swing the tip of the strap against the side of the trailer to prevent the strap from bouncing outwardly from the side of the trailer as it travels over rough roads. The offset nature of the hinge also results in the C-shaped strap continually attempting to pivot on around its pin member and thus keeps the tip of the strap in constant engagement against the side of the trailer.

It is an object of the invention to provide a trailer awning retaining device that is both easy to install and easy to operate.

It is an object of the invention to provide a trailer awning retaining device that is economical to manufacture and which can be inexpensively sold.

It is an object of the invention to provide a trailer awning retaining device that eliminates the hardware corrosion of past trailer awning retaining devices.

It is also an object of the invention to provide a trailer awning retaining device that will keep the rolled awning secured in place even while the trailer is being pulled at turnpike speeds.

It is an additional object of the invention to provide a trailer awning retaining device that uses the dead weight of the rolled awning to help keep it securely in place.

DESCRIPTION OF THE PREFERRED EMBODIMENT

Figure 1:
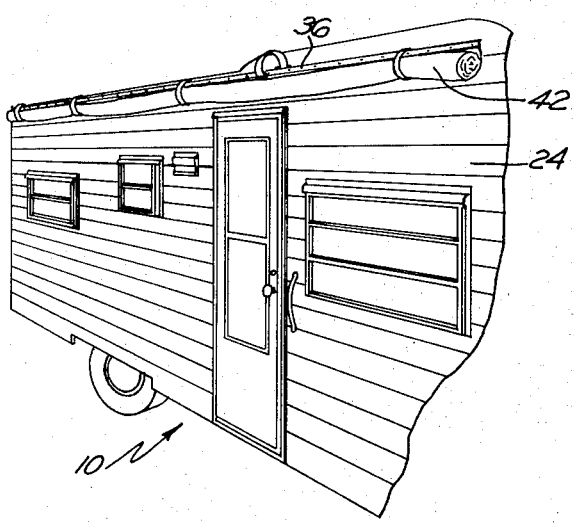
FIG. 1 is a partial perspective illustrating the trailer awning retaining device on the side of a trailer.

Referring to the drawings a trailer is generally designated numeral 10 in FIG. 1. For purposes of illustration applicant's novel trailer awning strap is shown secured to the left lateral side of the trailer although it is to be understood that applicant's trailer awning straps may be used in conjunction with awnings secured to any of the sides of the trailer. Also seen in FIG. 1 four of the straps are in locking position and one of the straps is illustrated in its pivoted upward position.

Figure 4:
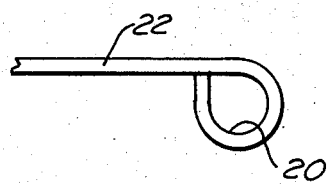
FIG. 4 is a partial end elevation of the top end of the C-shaped strap.
Figure 2:
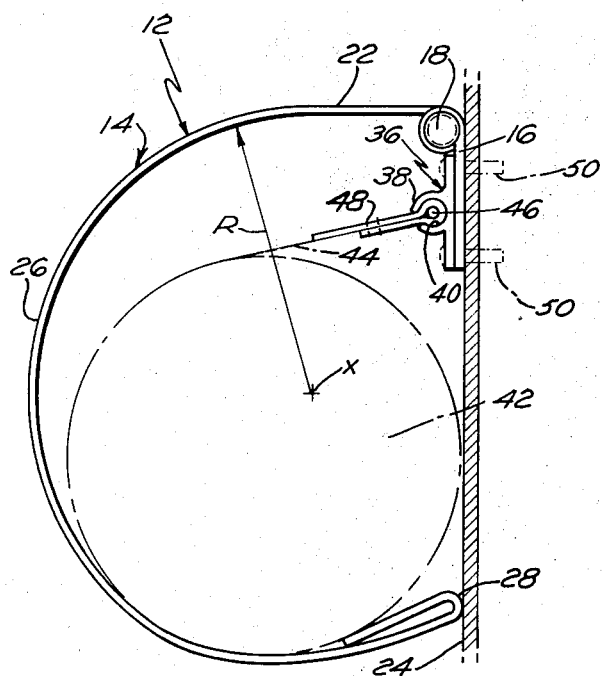
FIG. 2 is a partial end elevation of one of the awning retaining straps illustrated as it would appear mounted on the side of a trailer.
Figure 3:
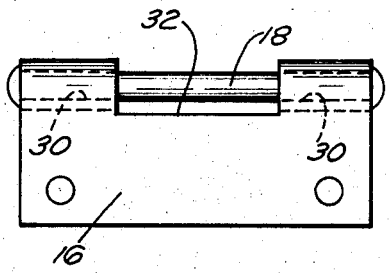
FIG. 3 is a botton view of the hinge plate.

In FIGS. 2 through 4 the specific structure of the trailer awning strap is illustrated. The trailer awning strap 12 is comprised of three elements, C-shaped strap 14, hinge plate 16 and pin 18. The C-shaped strap is preferably made from a metallic material such as aluminum which has undergone heat treatment and quenching to make its shape fairly rigid. Usually a slight amount of flexibility will remain in the metal which can be useful when placing the rolled awning underneath the strap. At the top of strap 14 the metal at the tip has been looped back over upon itself thus forming an integral hinge pin bore 20 (see FIG. 4). The portion of the C-shaped strap 14 which is adjacent the hinge pin bore is substantially flat which allows the strap to be pivoted outwardly and upwardly through an angle of approximately 90° without the top portion of the strap binding into the outer surface 24 of the trailer. Traveling on around strap 14 central portion 26 has a cross section which is substantially circular and which is generally described by the radius of curvature R as it travels around axis $x$. The area encompassed by the central portion is substantially equal to half that of a circle. At the lower end of strap 14 the metal has been looped back upon itself to provide tip 28 with a curved surface which bears against the wall of the trailer which helps to minimize surface wear on the side of the trailer.

Hinge plate 16 is also made of metal, preferably aluminum, and it has a pair of aligned hinge pin bores 30 that have been formed by looping an edge of the plate back upon itself. Plate 16 also has a cutaway section 32 between the two hinge pin bores and it is into this that the top end of the strap 14 mates allowing pin 18 to be passed through the three aligned bores and provide a hinge structure between the strap and plate members. Pin 18 is made of metal, preferably brass, to prevent corrosion between the hinge strap structure of the trailer awning strap. Pin 18 may also be formed with either a single head or a double head depending upon whether the C-shaped strap 14 is to be removable or not hinge plate 16.

The manner in which the trailer awning strap 12 is attached to the trailer is best illustrated in FIGS. 1 and 2. It will be seen that the awning rail 36 extends laterally along a substantial portion of side 24 of the trailer. It has a pair of vertically spaced fingers 38 which curve inwardly toward each other to form a substantially circular channel 40 that extends the length of awning rail 36. Received within this channel is the end of the awning 42 whose tip 44 is wrapped around a rope or cord 46 and back upon itself with stitching 48 securing the cord 46 within the loop. As illustrated the hinge plate 16 is secured to the side of the trailer beneath awning rail 36 by screws 50.

The operation of applicant's trailer awning retaining device is easily understood. With the awning in its extended position it is first rolled into a coil as close to the side of the trailer as possible. Next C-shaped straps 14 are lifted outwardly and upwardly a sufficient amount to allow the awning to be rolled a slight additional amount more and also to allow the coiled awning to be pushed upwardly into the area formerly enclosed by strap 14. Next strap 14 is allowed to drop downwardly due to its gravitational weight with its tip 28 riding underneath the rolled awning 42 and coming to rest against side 24 of the trailer. The rolled awning then seats into the position illustrated in FIG. 2 at the bottom of the curvature of strap 14 where its weight is applied on the strap. Each trailer awning strap is positioned in place in the same manner. With the awning thus secured the trailer may be towed free from worry that the awning will become unsecured at speeds upwardly of 60 miles per hour. While at travel and while at rest due to the offset nature of the hinge pin axis, the weight of the awning will swing the strap about its pivot to cause the tip 28 of the C-shaped straps to steadfastly bear against side 24 of the trailer. Additionally the weight of the rolled awning 22 as it seats in the lower curved portion of strap 14 acts to prevent the strap from bouncing outwardly and upwardly when travelling over rough roads.

It is further to be realized that applicant's novel awning strap could also be utilized with an awning on the side wall of a house, garage, building, etc., without changing its operational characteristics.

What is claimed is:

1. In combination a substantially vertical trailer wall, a rolled awning, means for securing one end of the awning along said wall, a plurality of C-shaped straps, means at the top end of said straps pivotally securing said straps to the wall of the trailer, each said strap being so shaped that its lower end is arched upwardly when allowed to hang freely by its gravitational weight, such shape causing the tip at the bottom end of the strap to rest against the side of the trailer with a positive force, each said strap along with the side of the trailer producing a closed loop within which the rolled awning is supportably held resting on the strap at a location within such upwardly arched portion and at a point spaced from the wall of the trailer at a distance greater than the axis of the pivot securing the strap to the wall of the trailer whereby the weight of the awning on the strap will maintain the tip of the strap against the wall of the trailer.

2. A rolled awning retaining device as recited in claim 1 wherein the C-shaped strap is formed of metal.

3. A rolled awning retaining device as recited in claim 2 wherein the means at the top end of said strap comprises an integrally formed hinge pin bore that has been formed by looping the tip of the metal back over upon itself.

4. A rolled awning retaining device as recited in claim 3 wherein the portion of the C-shaped strap adjacent the hinge pin bore is substantially flat thereby allowing the C-shaped strap to be pivoted outwardly and upwardly through an angle of approximately 90° without the top portion of the strap binding into the outer surface of the wall of the trailer.

5. A rolled awning retaining device as recited in claim 4 wherein the lower tip of the C-shaped strap is looped back upon itself to provide the tip that bears against the wall of the trailer with a curved surface that will minimize surface wear.

6. A rolled awning retaining device as recited in claim 5 wherein the means for pivoting the strap is a hinge plate having a pair of aligned hinge pin bores and a cutaway section between them into which the hinge pin bore at the top end of the strap mates whereby a pin may be passed through said three aligned bores.

7. A rolled awning retaining device as recited in claim 6 further comprising a pin made of brass for insertion through said bores and wherein said C-shaped strap and said hinge plate are both made of aluminum to prevent corrosion to this hinge which is normally exposed to all types of weather.

8. A rolled awning retaining device as recited in claim 4 wherein the portion of the C-shaped strap between said flat surface portion and the lower tip of the strap is substantially circular in cross section and the area encompassed by this portion is substantially equal to half of a circle.

* * * * *